US007746144B2

(12) United States Patent
Jimenez et al.

(10) Patent No.: US 7,746,144 B2
(45) Date of Patent: Jun. 29, 2010

(54) PULSE GENERATOR AND METHOD OF GENERATING PULSES, SUCH AS FOR TEMPLATE GENERATION IN IMPULSE RADIO SYSTEMS

(75) Inventors: Jose Luis Gonzalez Jimenez, Barcelona (ES); Diego Mateo Pena, Barcelona (ES); Enrique Barajas Ojeda, Barcelona (ES); Ignasi Cairo, Barcelona (ES); Masayuki Ikeda, Shiojiri (JP)

(73) Assignee: Seiko Epson Corporation (JP)

( * ) Notice: Subject to any disclaimer, the term of this patent is extended or adjusted under 35 U.S.C. 154(b) by 423 days.

(21) Appl. No.: 11/681,862

(22) Filed: Mar. 5, 2007

(65) Prior Publication Data
US 2007/0210848 A1 Sep. 13, 2007

Related U.S. Application Data

(60) Provisional application No. 60/780,019, filed on Mar. 6, 2006.

(30) Foreign Application Priority Data
Jun. 15, 2006 (EP) .................................. 06115540

(51) Int. Cl.
*G06F 1/04* (2006.01)
(52) U.S. Cl. ...................................... 327/299; 327/294
(58) Field of Classification Search ................. 327/261, 327/269, 272, 276–278, 291, 293, 294, 299
See application file for complete search history.

(56) References Cited

U.S. PATENT DOCUMENTS

| 5,321,734 | A | * | 6/1994 | Ogata | 377/47 |
| 5,838,178 | A | * | 11/1998 | Marbot | 327/116 |
| 6,037,812 | A | * | 3/2000 | Gaudet | 327/116 |
| 7,449,932 | B2 | * | 11/2008 | Ikeda | 327/291 |
| 2006/0062278 | A1 | | 3/2006 | Ishii | |

FOREIGN PATENT DOCUMENTS

EP  1 499 046  9/1999

(Continued)

OTHER PUBLICATIONS

Yan Tong, et al., "A Coherent Ultra-Wideband Receiver IC System for WPAN Application", IEEE International Conference on Ultra-Wideband, ICU Sep. 2005, pp. 60-64.

(Continued)

*Primary Examiner*—Hai L Nguyen
(74) *Attorney, Agent, or Firm*—Harness, Dickey & Pierce, P.L.C.

(57) ABSTRACT

The pulse generator comprises: a delay line arranged to receive a digital input signal and to produce a plurality of delay line output signals; first and second pulse generator blocks comprising logic circuitry arranged to generate a plurality of successive first output pulses in response to said different delay line output signals; and pulse combiner circuitry arranged to combine said first output pulses to produce second output pulses. The first pulse generator block is arranged to be responsive to rising edges of said input signal, and the second pulse generator blocks is responsive to falling edges of said input signal. Thus, both rising and falling edges of said input signal are used to create pulses. The device can be used in impulse radio transmitters and receivers.

25 Claims, 8 Drawing Sheets

FOREIGN PATENT DOCUMENTS

WO WO2005/053259 6/2005
WO WO2005/067160 7/2005

OTHER PUBLICATIONS

Hyunseok Kim, et al., "Digitally Controllable Bi-Phase CMOS UWB Pulse Generator", IEEE International Conference on Ultra-Wideband, ICU Sep. 2005, pp. 442-447.

Takahide Terada, et al. (Department of Electronics and Electrical Engineering, Keio University, Yokohama, Japan), "A CMOS Impulse Radio Ultra-Wideband Transceiver for 1Mb/s Data Communications and ±2.5cm Range Findings", 2005 Symposium on VLSI Circuits Digest of Technical Papers, Jun. 16-18, 2005, pp. 30-33.

\* cited by examiner

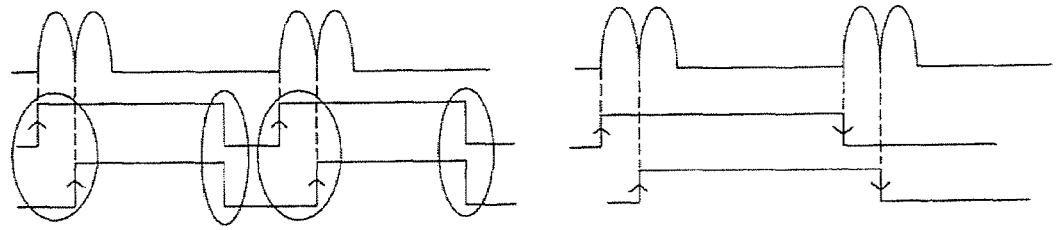
FIG. 4A
PRIOR ART
FIG. 4B
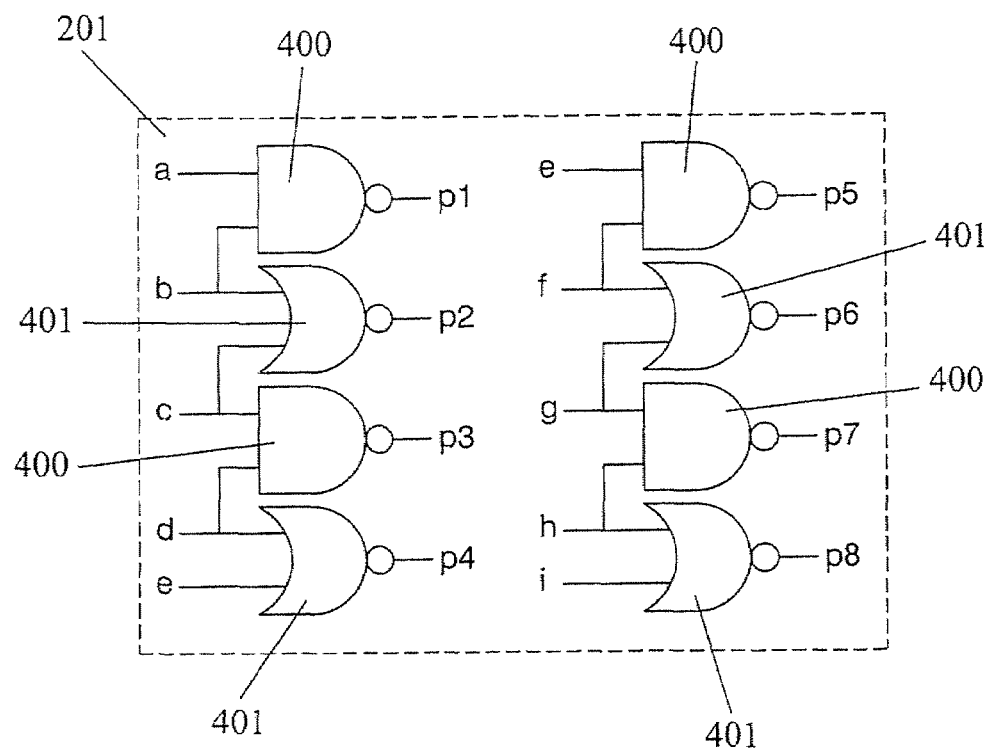
FIG. 5

|  | $a$ | $b$ | $c$ | $d$ | $e$ | $f$ | $g$ | $h$ | $i$ |
|---|---|---|---|---|---|---|---|---|---|
| 201— | $D_1$ | $\overline{D_2}$ | $D_3$ | $\overline{D_4}$ | $D_5$ | $\overline{D_6}$ | $D_7$ | $\overline{D_8}$ | $D_9$ |
| 202— | $D_2$ | $\overline{D_3}$ | $D_4$ | $\overline{D_5}$ | $D_6$ | $\overline{D_7}$ | $D_8$ | $\overline{D_9}$ | $D_{10}$ |
| 301— | $\overline{D_1}$ | $D_2$ | $\overline{D_3}$ | $D_4$ | $\overline{D_5}$ | $D_6$ | $\overline{D_7}$ | $D_8$ | $\overline{D_9}$ |
| 302— | $\overline{D_2}$ | $D_3$ | $\overline{D_4}$ | $D_5$ | $\overline{D_6}$ | $D_7$ | $\overline{D_8}$ | $D_9$ | $\overline{D_{10}}$ |

FIG. 7

PULSE GENERATOR AND METHOD OF GENERATING PULSES, SUCH AS FOR TEMPLATE GENERATION IN IMPULSE RADIO SYSTEMS

RELATED APPLICATIONS

This application is a non-provisional of U.S. Provisional Patent Application No. 60/780,019, filed Mar. 6, 2006. This application claims the benefit of European Patent Application No. 06115540, filed Jun. 15, 2006. The disclosures of the above applications are incorporated herein by reference.

FIELD OF THE INVENTION

The invention relates to pulse generators, such as pulse generators for use in Ultra Wideband (UWB) communication systems, for example, as template generators useful in UWB receivers.

STATE OF THE ART

UWB communication systems use short pulses as information bearing signals, and are virtually carrierless. Thus, the information to be transmitted resides in the pulses and is not modulated on any carrier wave. Due to the short pulses, UWB communication systems have a very large bandwidth, and the transmitted power is spread over a very wide spectrum. The transmitted power is very low and due to the wide bandwidth, UWB communication systems are unlikely to interfere with conventional narrowband communication systems. There has been a grooving interest in UWB systems for wireless communication, at least partly due to the fact that the corresponding spectrum of 3.1-10.6 GHz was released for unlicensed use for indoor and hand-held systems in 2002, by the U.S. Federal Communication Commission.

Impulse radio (IR) implementations of the UWB communication can imply advantages such as low complexity, low power consumption, high data rates, and the ability to coexist with other radio systems.

The usual IR-UWB transmitter consists on a pulse generator that is triggered regularly by a timing circuitry. The output of the pulse generator is connected directly to the antenna. No power amplifier is needed since the UWB transmitted power is very low. Data is transmitted by modifying some parameter of the pulse (for example, its sign in BPSK, or its position in PPM modulation). The transmitted output waveform has a very low duty cycle, as the transmitted signal comprises sub-nanosecond pulses sent one and one in subsequent time frames that, for usual data rates, can have a duration of several nanoseconds. A time hopping (TH) technique is commonly used to allow multiple access and to avoid peaks in the spectrum of the UWB signal. A pseudorandom code can be used to locate each successive pulse in a different position along its frame.

The IR-UWB receiver can be implemented in several ways. A known one is based on a coherent receiver using a matched filter to detect the received pulse. The matched filter receiver decides the received symbol (for example, "0" or "1") after integrating the result of a multiplication of the received signal with a locally generated template waveform. The received signal can be processed in the analogue domain to optimize power consumption. The template waveform can be matched to the received pulse waveform to optimise the receiver. However, generating an optimal template can be difficult and power-consuming (sinusoidal templates have been proposed recently as power-efficient design solutions; they may not be optimal, but they sometimes offer more timing robustness than an optimal matched filter).

The pulse generator is an important component of UWB systems, both at the transmission end and at the reception end, where the so-called template generator is used to create the template, namely, a pulse train which, as explained above, is combined with the incoming signal so as to allow detection of the relevant parameters of the incoming signal, by correlating the incoming signal with the template. Examples of prior art UWB systems, including examples of pulse and template generators, are disclosed in, for example, WO-A-2005/067160 and WO-A-2005/053259. Further examples of documents relating to this technology are Yan Tong, et al., "*A Coherent Ultra-Wideband Receiver IC System for WPAN Application*", IEEE International Conference on Ultra-Wideband, ICU September 2005, pages 60-64; Hyunseok Kim, et al., "*Digitally Controllable Bi-Phase CMOS UWB Pulse Generator*", IEEE International Conference on Ultra-Wideband, ICU September 2005, pages 442-447; Takahide Terada, et al. (*Department of Electronics and Electrical Engineering*, Keio University, Yokohama, Japan), "*A CMOS Impulse Radio Ultra-Wideband Transceiver for 1 Mb/s Data Communications and +2.5 cm Range Findings*", 2005 Symposium on VLSI Circuits Digest of Technical Papers, 16-18 Jun. 2005, pages 30-33.

The purpose of the invention is to provide an alternative pulse generator design, featuring low power consumption.

SUMMARY

A first aspect of the invention relates to a pulse generator that comprises:

A delay line arranged to receive a digital input signal and to produce a plurality of delay line output signals each comprising a respective delayed version of the input signal. Each of said delay line outputs can be dual, that is, can include a "non-inverted" version and the "inverted" version of the delayed signal. The delay line output signals can be delivered to the subsequent stages through buffers, in order to restore the levels of the signal to the relevant logic levels compatible with the subsequent stages of the circuit. The delay line can comprise a plurality of substantially identical delay line cells, each delaying the input signal to a certain extent. The delay caused by each cell can, for example, be regulated by a controlled voltage, in which case the delay line is a so-called Voltage Controlled Delay Line (VCDL). However, also other types of delay lines can be used within the general scope of the invention.

At least two pulse generator blocks. Each of said pulse generator blocks comprises logic circuitry arranged to receive, at a plurality of logic circuitry inputs, different delay line output signals (each of said delay line output signals can be selected to be the inverted version or the non-inverted version of the basic delayed signal). Each of said pulse generator blocks is arranged to generate a plurality of successive first output pulses in response to said different delay line output signals. Here, the term "block" should primarily be understood in a general, functional sense, that is, as implying a group of elements that together perform a certain function. Although these elements may be grouped together as a "physical" block, also other structural arrangements are possible within the general scope of the invention.

Pulse combiner circuitry (for example, one pulse combiner block associated with each pulse generator block) arranged to combine said first output pulses in order to produce, in response to said first output pulses from each of said pulse generator blocks, a corresponding plurality of second output pulses, which can constitute an output signal from the circuitry, for example, a pulse template for an UWB-IR receiver.

In accordance with the invention, a first one of said pulse generator blocks is arranged (by their constitution and/or by their connection to the delay line) to be responsive to rising edges of said input signal so as to produce a first set of said first output pulses derived from successively delayed versions of said rising edges, whereas a second one of said pulse generator blocks are arranged to be responsive to falling edges of said input signal so as to produce a second set of said first output pulses derived from successively delayed versions of said falling edges.

Thus, not only the rising but also the falling edges of the input signal are used to create pulses, thus reducing the amount of power that is dissipated in the system without contributing to the creation of the pulses. Thus, the pulse generator according to the invention can be made advantageously efficient in what concerns its power consumption. Also, the basic architecture is simple and easy to implement in an integrated circuit, for example, using CMOS technology.

The logic circuitry of each of said pulse generator blocks can comprise a plurality of logic gates arranged to produce, one logic gate after the other and in response to the respective delay line output signals, a respective one of said first output pulses. The sequential "activation" or "triggering" of the logic gates can thus be determined by the way the inputs of said gates are connected to the outputs of the delay line.

Said logic gates can be arranged to produce, one logic gate after the other, said respective one of said first output pulses in a manner so that said first output pulses are, alternatingly, falling pulses and rising pulses. This can be useful for implementing a simple control of the final output signal by way of, for example, connecting the output signals, two by two, to respective transistor pairs arranged in parallel, so as to selectively connect, through said transistors, an output terminal to a high voltage or to a low voltage or ground, in accordance with the sequence of changes of the state at the outputs of the logic gates. The logic circuits can be cascaded in a way so that the same delay signal is applied simultaneously to two subsequent logic gates, so as to "deactivate" one of them at the same time as the subsequent one is "activated".

Said logic gates can be arranged to be triggered one after the other in accordance with a sequence, and said logic gates can be arranged in said sequence so that if one logic gate is a first type of logic gate (such as a NAND or an AND gate), the following logic gate is a second type of logic gate (for example, a NOR or an OR gate) differing from the first type of logic gate. Thereby, it is easy to implement of sequence of alternately falling and rising first output pulses.

The pulse generator blocks can be identical, which can further contribute to the simplicity of the circuit and of its design.

A first one of said pulse generator blocks and a second one of said pulse generator blocks can be connected to said delay line so that when an input of said first one of said pulse generator blocks receives a signal from said delay line, a corresponding input of said second one of said pulse generator blocks receives an inverted version of said signal from said delay line. This can facilitate implementation of a system in which one of the blocks is triggered by the rising edge and another one by the falling edge of the input signal.

Each of said pulse generator blocks can comprise N inputs and (N−1) outputs, and said logic circuitry can comprise (N−1) logic gates each having two inputs and one output. Further, said pulse generator blocks and said pulse combiner circuitry can be arranged so as to produce, for each positive and negative flank of said input signal, respectively, a group of (N−1)/2 of said second output pulses (OUT). N can for, example, be an odd number not lower than 5 and not higher than 13, which would imply that a pulse train triggered by one rising or falling edge would comprise 2-6 pulses (that is, each sequence of second output pulses would comprise 2-6 pulses). In a preferred embodiment, N=9, whereby the pulse train comprises 4 pulses, which can be a suitable number of cycles for an IR-receiver template.

The power consumption of a pulse generator as described above depends strongly on the number of cycles of the output waveform.

Further, in the case of the template according to the invention, 2-6 cycles, especially 4 cycles, have been observed to provide optimal performance when the issue is to reduce the signal-to-noise-ratio degradation due to timing errors. Thus, the pulse generator, when used as a template generator, can be arranged to produce an appropriate number of pulses in each frame, for example, pulse trains comprising 2-5 pulses, fore example, 4 pulses. The optimal number of pulses depends on how the original pulse is deformed during transmission, and this depends, inter alia, on parameters such as distance between the transmitter and the receiver and the bandwidth of the system (including the antenna used for transmission, the channel, the receiving antenna and the front-end of the receiver, up to the multiplier). The number of template pulses necessary in order to produce an optimal detection will depend on the way the transmitted signal pulses are "widened" during transmission.

The relevance of the number of pulses can be said to be due to the fact that the design of UWB-IR communication systems is constrained by two important issues: interferences and power consumption. The system must be operative in the presence of strong interferences from narrow band communication systems located in the vicinity of the UWB link, in practice, especially those operating in the 2.4 GHz and 5 GHz ISM (Industrial, Scientific and Medical) bands. For this reason, it can be convenient to restrict the bandwidth of an UWB system, setting it to only 10% of the UWB band and centering said 10% bandwidth at, for example, around 8 GHz, for example, extending from 6.6 to 9 GHz, thus avoiding the lower fraction of the FCC UWB band. Now, this kind of reduction in the available bandwidth of a UWB pulse transmission system affects the pulse waveform that is actually detected at the receiver end. For example, when a Gaussian monocycle of 49.50 ps of width is sent by a transmitter, a quite different waveform is received at the receiver. Thus, a template matched to the theoretical Gaussian monocycle (which is used in some prior art systems) would not correctly capture the received pulse energy, as the received pulse waveform has been modified and considerably enlarged.

Specific optimum templates could be used to match the waveform of the received pulses. Now, the circuital realization of such optimum templates can be very complicated. Sinusoidal templates have been proposed as an alternative. However, for high data transmission rates, generating pure sinusoidal bursts by turning a local oscillator on and off can be impractical. Instead, a square wave appears to be preferable and is preferably used in the present invention. Actually, when the multiplication is done using a passive mixer operating in its non-linear regime, the template will basically act as a sign function (as long as it has sufficient amplitude). Therefore, the particular shape of the template may be irrelevant, and the important waveform parameter can correspond to the zero crossings of the template waveform.

In coherent receivers, the timing alignment between the template and the received pulse must be accurate; the signalto-noise ratio degradation as a function of the timing errors is an important aspect to be considered. It has been found that the performance loss incurred by using a square waveform instead of the "optimal" template will be rather low (in the order of 4 dB) independently of the timing error. Mistiming, however, has an important negative impact on the signal-to-noise ratio.

Also the template length has an impact on the signal-to-noise ratio. The number of cycles (or pulses) of the template should be chosen to optimize the capture of signal energy versus noise energy. For example, a longer template will collect more energy from the tail portions of the received pulse, but it will also collect also more noise. Experiments have been performed in order to determine the way the signal-to-noise ratio depends on the number of cycles of a template. It has been found that for at least some waveforms, based on the above-mentioned Gaussian monocycle as received with a receiver featuring the 10% bandwidth mentioned above, the optimal template length for the receiver could be four cycles (although two, three, five or six cycles also provide adequate results).

The delay line can be arranged to produce at least 10 differently delayed versions of said input signal (and, for each output signal, also a complementary output signal comprising the inverted version thereof), by means of at least 10 substantially identical delay cells. Each delay line output signal can be provided at a non-inverted output and at an inverted output of said signal delay line, for example, through buffers that restore the logic levels of the signal so as to provide an adequate swing at the output, compatible with the subsequent elements of the circuit to which the delay line output signals are to be supplied.

The pulse combiner circuitry can comprise a plurality of pairs of cascaded transistors (whereby each transistor pair can comprise two complementary transistor types, for example, one PMOS and one NMOS transistor, one of which is connected to a supply voltage and the other one to ground or similar), said pairs being arranged in parallel, connected to a common output end at which said second output pulses are delivered, said transistor pairs being arranged so that the transistors are activated sequentially by the respective pulse generator block so as to alternatingly connect said output to a first voltage level (for example, to a power supply voltage Vcc) and to a second voltage level (for example, ground).

The pulse combiner circuit can comprise one pulse combiner block for each of said pulse generator blocks, each of said pulse combiner blocks comprising the corresponding pulse combiner circuitry.

Further, the pulse generator can comprise, for each of said two pulse generator blocks, two complementary pulse generator blocks arranged with corresponding pulse combiner circuitry so as to produce further second output pulses, combinable with said second output pulses so as to produce a differential output signal (this can be produced by using a differential transistor pair connected to each pair of pulse combiner block and complementary pulse combiner block; the obtained differential output signal can then constitute a differential output of a template generator that can be supplied to, for example, the input of a mixer in a UWB-IR receiver).

The pulse generator blocks can be arranged (by their constitution and/or by their connection to the delay line) so that said first set of said first output pulses is generated in a first time frame and so that said second set of said first output pulses is generated in a second time frame, not overlapping with said first time frame. Thus, the first set and the second set of the first input pulses can be used to generate separate "template signals" or "pulse trains", corresponding to different time frames. In this way, a rising edge of the input signal will trigger a first pulse train, and the falling edge will trigger a second pulse train, not overlapping with the first pulse train but, for example, substantially separated in time from said first pulse train. This can be useful when the issue is to produce IR templates, as it, for example, provides for a simple implementation of a power efficient circuit.

Another aspect of the invention relates to a template generator for an impulse radio receiver. The template generator comprises a pulse generator according to what has been described above.

A further aspect of the invention relates to an impulse radio receiver arranged to receive impulse radio signals and comprising signal processing circuitry for processing received impulse radio signals so as to extract information content. The signal processing circuitry includes a template generator for producing a pulse template comprising a plurality of pulses. The signal processing circuitry further includes at least one mixer for mixing said pulses with said received signal. In accordance with the invention, the template generator comprises a pulse generator as described above.

Actually, another aspect of the invention relates generally to an impulse radio component or equipment comprising a pulse generator as described above. The component can be an impulse radio receiver (in which case the component can comprise receiving circuitry), but it can also be a transmitter component, including transmitter circuitry such as means of modulating the transmitted pulses in accordance with information to be transmitted, etc.

Another aspect of the invention relates to a method of producing a plurality of pulses. Said method comprises the steps of:

successively delaying a digital input signal so as to produce a plurality of delayed signals each comprising a respective delayed version of the input signal (this "version" does of course not have to be exactly identical to the original signal, for example, distortions can be accepted);

supplying said delayed signals to plurality of inputs of a logic circuitry so as to generate a plurality of successive first output pulses in response to said delayed signals;

combining said first output pulses so as to produce a plurality of second output pulses, which can constitute the output signal of the pulse generator.

In accordance with the invention, said delayed signals are supplied to said logic circuitry so that a first set of said first output pulses are derived from successively delayed versions of rising edges of said digital input signal, whereas a second set of said first output pulses are derived from successively delayed versions of falling edges of said digital input signal.

What has been stated above concerning the devices is also applicable to the method of the invention, mutatis mutandis.

For example:

Said logic circuitry can comprise a plurality of logic gates arranged to produce, one logic gate after the other and in response to the respective delayed signals, a respective one of said first output pulses.

Said logic gates can further be arranged to produce, one logic gate after the other, said respective one of said first output pulses in a manner so that said first output pulses are, alternatingly, falling pulses and rising pulses.

The method can further comprise the steps of generating, for each one of a plurality of subsequent time frames, a template comprising a plurality of subsequent pulses, said plurality of pulses comprising not less than 2 and not more than 5 of said second output pulses. For example, said plurality of subsequent pulses can comprise 4 of said second pulses.

Said first set of said first output pulses can be generated in a first time frame and said second set of said first output pulses can be generated in a second time frame, not overlapping with said first time frame.

Another aspect of the invention relates to a method of processing a signal received in an impulse radio receiver, so as to extract information content from said signal. The method comprises the steps of providing a pulse template comprising a plurality of pulses, and mixing said pulses or pulse template with said received signal so as to obtain a resulting signal that is forwarded (for example, after passing through an integrator) to a decision making part of the radio receiver. The pulse template is obtained with a method according to what has been disclosed above.

BRIEF DESCRIPTION OF THE DRAWINGS

To complete the description and in order to provide for a better understanding of the invention, a set of drawings is provided. Said drawings form an integral part of the description and illustrate a preferred embodiment of the invention, which should not be interpreted as restricting the scope of the invention, but just as an example of how the invention can be embodied. The drawings comprise the following figures:

FIGS. 4A and 4B schematically illustrate the difference between prior art pulse generation and pulse generation in accordance with the invention.

FIG. 5 is a circuit diagram of the logic circuitry of a pulse generator block.

FIG. 7 is a table that schematically illustrates how the outputs of the delay line are connected to the pulse generator circuit, in accordance with an embodiment of the invention.

DETAILED DESCRIPTION

The pulse generator according to the preferred embodiment described herein is useful for, for example, UWB transmitters and receivers for impulse radio (IR). For example, said pulse generator can be appropriate for implementing low-power, high data transmission rate (for example, 200 Mbps or more) and short range (for example, <1 m) IR-UWB systems.

Figure 1:
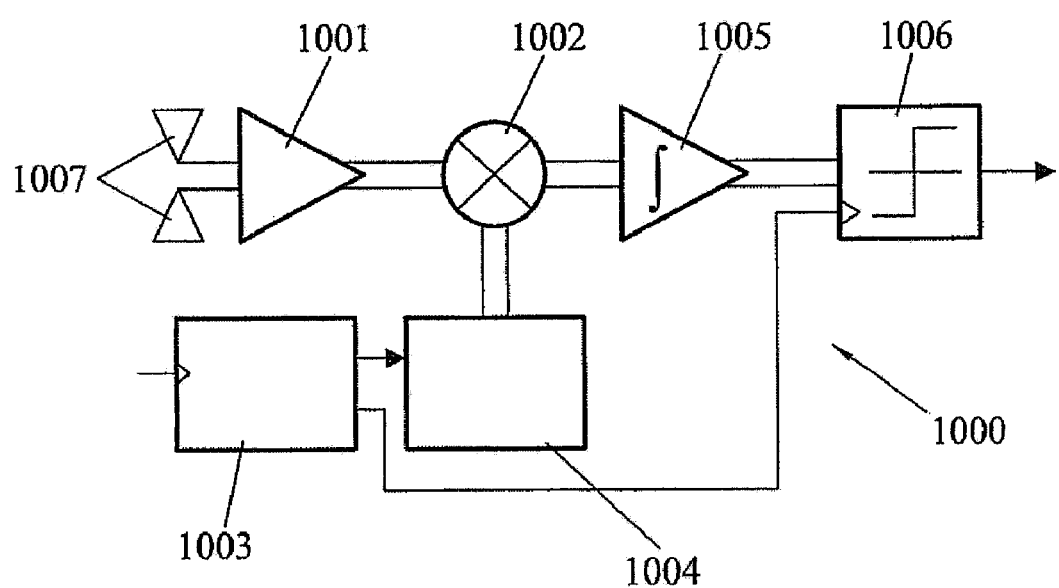
FIG. 1 is a block diagram of an UWB-IR receiver in accordance with a preferred embodiment of the invention.

FIG. 1 illustrates an impulse radio receiver 1000 in accordance with an embodiment of the invention, based on a conventional structure, but incorporating a template generator 1004 in accordance with the invention (a preferred embodiment of the template generator will be described in more detail below). In addition to the template generator, the impulse radio receiver comprises an antenna 1007 connected to a signal processing circuitry arranged to process the signals received by the antenna. Said signal processing circuitry comprises, in accordance with this embodiment of the invention, a low noise amplifier 1001 connected to the antenna and arranged to amplify the signal received by the antenna, and a so-called analog demodulator or "correlator" comprising the template generator 1004, a mixer 1002 (a passive mixer can be used to reduce power consumption) and an integrator 1005. The mixer 1002 is arranged to mix or multiply the signal received from the low noise amplifier 1001 with a pulse train generated by the template generator 1004, and the resulting signal is then integrated by the integrator 1005. The signal obtained by the integrator is then submitted to a comparator 1006 which determines the information content of the signal and produces an output signal indicative of said information content. The template generator 1004 and the comparator 1006 are synchronised by a timing controller 1003 that provides a synchronisation signal to the template generator 1004 and to the comparator 1006. The timing controller 1003 (which can comprise a delay locked loop and an edge selector) is controlled by an external reference clock signal. The signal path is differential from the antenna to the integrator, which is advantageous for suppressing noise components in the received signal.

The above general structure, as shown in FIG. 1, is conventional and there is thus no need to describe it with more detail here. The invention relates to the pulse generator that here constitutes the template generator 1004. The rest of the structure is a conventional IR receiver structure. In this case, a single receiver path is used. However, the template generator can also be directly applicable to other structures, for example, to a receiver involving quadrature multiplication (that is, two receiver paths with 90° phase shifted templates), which are useful to reduce the impact of timing errors on the signal-to-noise ratio. Also, the template generator can be directly applicable also to a transmitter (such as a UWB-IR transmitter), when adapted to provide the corresponding modulation. Usually, well characterized pulses such as the n:th derivative of the Gaussian pulse are used; however, generating such pulses requires complex generator circuitry. On the other hand, the most important requirement for the pulse generator is not the pulse shape itself, but rather its spectral characteristics, which should respect the regulatory emission templates. Now, this can also be achieved with a more simple pulse generator whereby spectral shaping can subsequently be obtained by means of the antenna or by some additional transmission filter.

In this context, the template generator of the present invention can also be used as the pulse generator of an IR-UWB transmitter. Control signals can be applied to modify some of the properties of the generated waveform, in accordance with a binary data sequence, so as to implement pulse modulation. For example, by selecting two different delayed versions of the trigger input, PPM (pulse phase modulation) can be directly implemented. By selectively reversing the two single ended outputs of the generator to form a differential waveform that carries the information in accordance with the amplitude of the differential signal, PAM (pulse amplitude modulation) can be implemented. OOK (on-off keying) modulation can also be provided by selectively triggering (ON) or not triggering (OFF) the generator.

Figure 2:
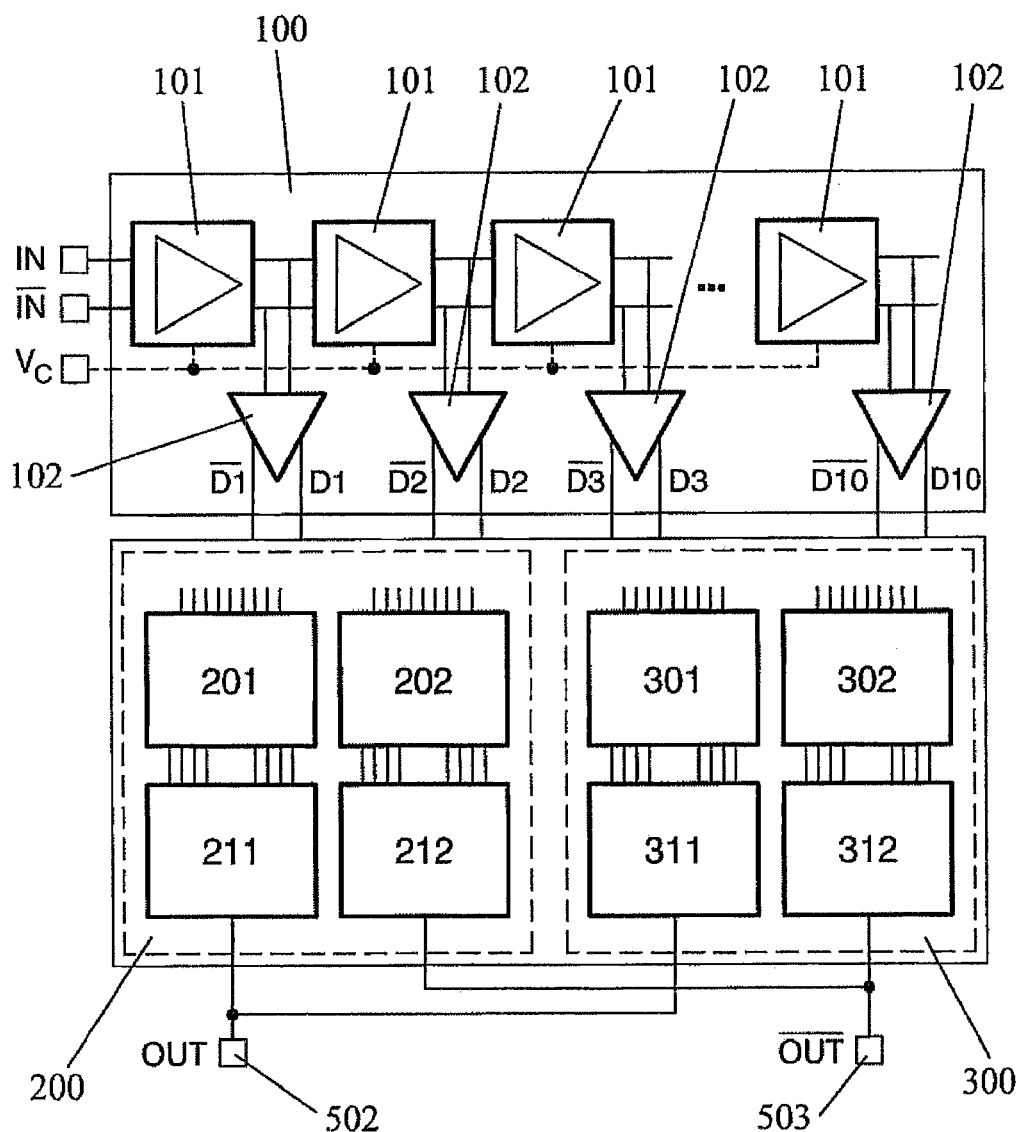
FIG. 2 is a block diagram of a template generator suitable for said UWB-IR receiver, in accordance with said embodiment of the invention.

FIG. 2 illustrates the general constitution of a pulse generator in accordance with a preferred embodiment of the invention. The pulse generator is fully differential (the complementary signals, that is, generally, the inverted ones are conventionally indicated in the drawings by a line above the symbol identifying the respective signal). An input signal IN (originated by the timing controller 1003 of FIG. 1) is supplied to a Voltage Controlled Delay Line (VCDL) 100, comprising a plurality of cascaded delay cells 101 arranged to produce, at their outputs, a plurality of successively delayed versions of the input signal. The input signal (IN) is, basically, to be generated by the timing controller every frame, when a pulse is expected to be received.

If a four cycles long pulse train is to be generated at the output of the pulse generator, the delay line could conveniently comprise 10 delay cells 101, as will be understood from the description following further below.

Figure 3:
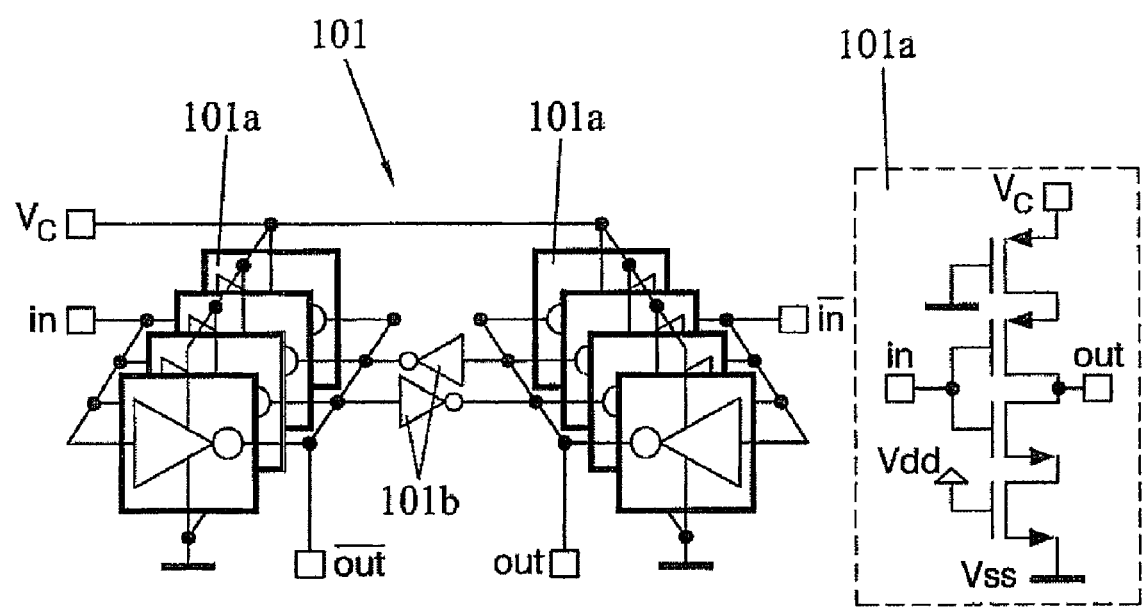
FIG. 3 schematically illustrates the layout of a delay cell of said template generator.

The structure of a delay cell 101 is schematically illustrated in FIG. 3. Actually, the same basic type of delay circuit can also be used in the delay locked loop of the timing controller 1003. Now, the stage delay required in the pulse generator can be much smaller than the stage delay required in the timing controller 1003. For this reason, as shown in FIG. 3, four delay circuits 101a in parallel are used for each branch, to increase its drivability. Two cross coupled weak inverters 101b are placed between the outputs of the delay cell to guarantee the differential operation. The basic delay circuit 101a is a CMOS inverter with active loads in both of the pull-up and the pull-down connections. The pull-down network is connected to ground (Vss) and the pull-up network is connected to an adjustable supply voltage ($V_c$) (Vdd represents the high voltage level). The delay of the basic delay circuit is adjusted by varying this voltage. Since the delay of the stages of the delay line are controlled varying the supply voltage, the high-level output voltage from the delay cells 101 will depend on the control voltage $V_c$. Thus, it is convenient to restore the logic voltage levels at the outputs of the delay line (that is, the logic levels of the delay line output signals D1-D10 corresponding to the respective delayed versions of the input signal) to have full swing. This is achieved by providing, for each delay cell 101, a buffer 102 comprising a level-shifter circuit. Thus, this buffer 102 is inserted between each delay cell and the following stage of the pulse generator to which the delay line output signals (D1 . . . D10) are to be supplied. As schematically illustrated in FIG. 2, also the buffers are differential in order to produce the corresponding delay line output signal (D1 . . . D10) both according to its "normal" and its "inverted" value.

The delay line output signals (D1 . . . D10) at the outputs of the buffers 102 are supplied to the so-called pulse generator blocks (201, 202, 301, 302) to generate the corresponding "first pulses" from the respective particular combination of edges. These pulse generator blocks comprise conventional complementary CMOS logic gates—NAND (400) and NOR (401)—, and the "first output pulses" (p1-p8) produced by the pulse generator blocks are used by a pulse combiner circuitry comprising pulse combiner blocks (211, 212, 311, 312) to alternatingly connect an output (OUT: 502, 503, where 503 can be considered to correspond to the differentially complementary output to 502, although it rather corresponds to a delayed version thereof) of the circuit to high voltage (Vdd) or to ground (Vss), as will be described with more detail below.

FIG. 2 schematically illustrates how the pulse generator blocks and the pulse combiner blocks are arranged in two different sections, namely, pulse generator blocks 201 and 202 as well as pulse combiner blocks 211 and 212 are arranged in a "rising edge section" 200, that is, they are arranged to be triggered by the delay line output signals corresponding to a rising edge of the input signal (IN), while pulse generator blocks 301 and 302 and pulse combiner blocks 311 and 312 are arranged in a "falling edge section" 300, that is, they are arranged to be triggered by the delay line output signals corresponding to a falling edge of the input signal (IN). That is, the pulse generator blocks and the pulse combiner blocks are grouped in two sections, operated by the rising and falling edges of the input signals coming from the VCDL, respectively. In this way, power consumption can be reduced, as the pulse generator produces its output pulses in response to both rising and falling edges of the input signal. Traditionally, in this kind of pulse generators, and, especially, in pulse generators used in UWB-IR systems, the output pulses are generated only for one of the edges (rising or falling) of the triggering input signal, whereas the opposite edge produces power consumption (in the delay cells, in the logic circuits, etc.) not used for the pulse generation. Thus, some power is required to reset the initial state of the template/pulse generator, thereby involving a corresponding power consumption. Contrarily, the present invention implies that pulses (such as an UWB-IR receiver template) are produced for both edges (that is the rising and the falling one) of the input signal. As a consequence, all the power dissipated is used to generate the output pulses.

This is schematically illustrated in FIGS. 4A and 4B, wherein FIG. 4A shows how (in accordance with prior art) each pulse is generated by one rising edge of an input signal, whereby, in order to produce the four output pulses shown in FIG. 4A, a total of four rising edges are used, followed by the corresponding falling edges. Contrarily, in FIG. 4B, which illustrates the principles of the invention, four output pulses are produced by two rising edges and by two falling edges, due to the fact that also the falling edges are used for pulse generation, and not "wasted" as in FIG. 4A.

FIG. 5 schematically illustrates a possible configuration of the pulse generator block 201 (the other pulse generator blocks 202, 301, 302 are identical; the only difference between the pulse generator blocks resides in the way the inputs (a . . . i) of the logic gates (400, 401) are connected to the outputs (D1 . . . D10, including the "inverse" outputs) of the delay line 100). The NAND gates 400 of the pulse generator block generate a negative pulse from a combination of a rising edge followed by a falling edge. The NOR gates 401 generate a positive pulse from a falling edge followed by a rising edge. The outputs of the logic gates are referred to as p1-p8 in the drawings.

One suitable way in which the inputs (a . . . i) of the logic gates (400, 401) can be connected to the delay line outputs (D1 . . . D10) is indicated in the table of FIG. 7.

Figure 6:
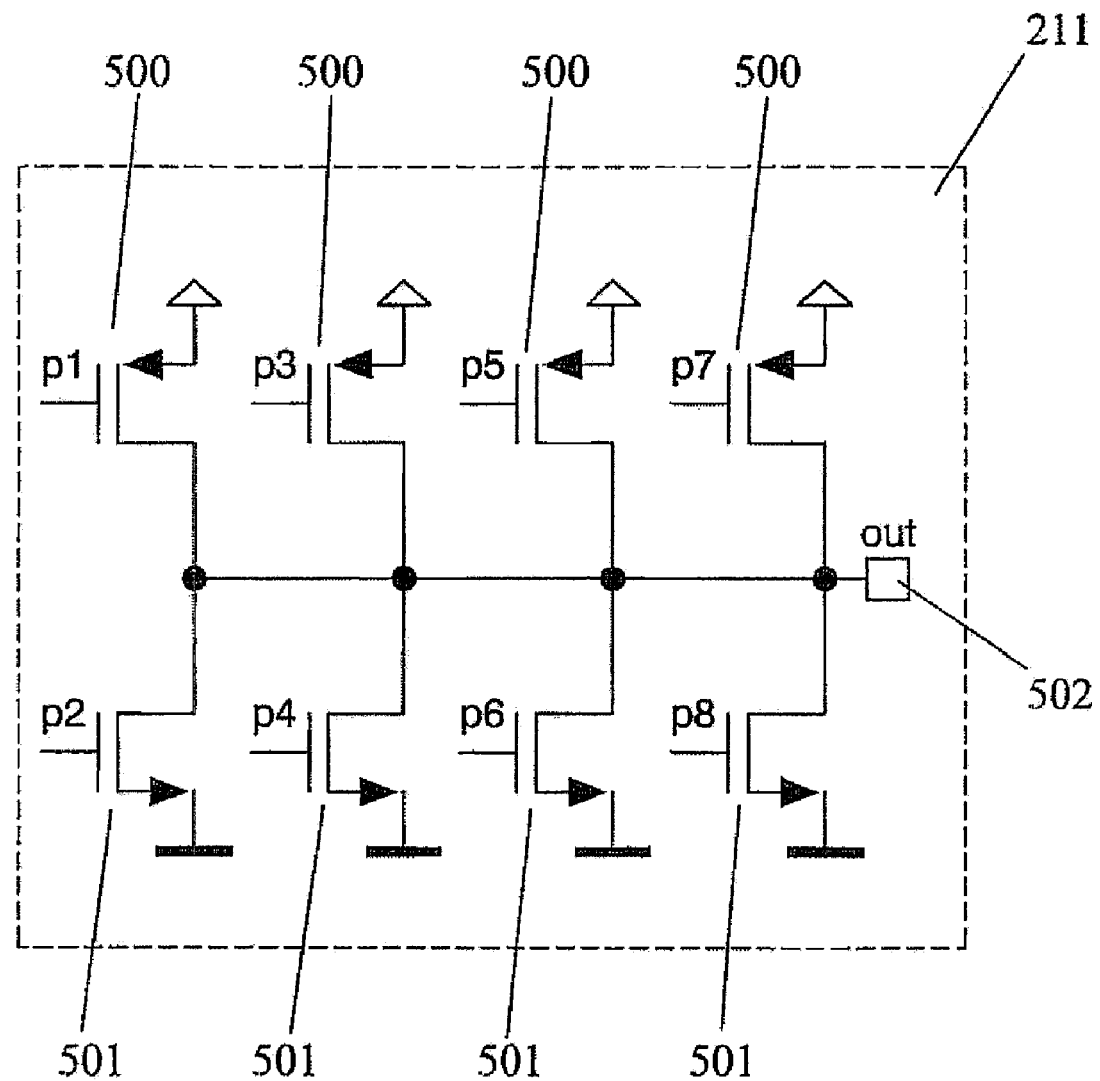
FIG. 6 is a circuit diagram of a pulse combiner block.

The pulse combiner blocks can each be constituted as the pulse combiner block 211 illustrated in FIG. 6, that is, by NMOS 501 and PMOS 500 transistor pairs, the transistors being connected in cascade between supply voltage and ground, the transistor pairs being arranged in parallel and connected, between the two transistors of each transistor pair, to the corresponding output (in this case, 502). FIG. 65 also schematically illustrate how the outputs (p1-p8) of the logic gates of the pulse generator block are connected to the transistors.

Each of the two sections (the rising edge section 200, and the falling edge section 300, as explained above) generates two single ended complementary outputs (502, 503), which once considered together form a differential signal required to drive a fully differential passive mixer. The corresponding outputs of the two sections (200, 300) can be connected together if the outputs of the pulse combiner blocks (211, 212, 311, 312) are floating in the default state: when one of the pulse combiner blocks (for example, pulse combiner block 211 corresponding to the rising edge section 200) is driving the output 502, the other corresponding pulse combiner block 311 (that is, the corresponding pulse combiner block one in the falling edge section 300) is in the default state.

The entire pulse generator can be implemented in a 0.18 μm CMOS process (suitable for implementing high speed devices, such as impulse radio circuits).

Figure 8A:
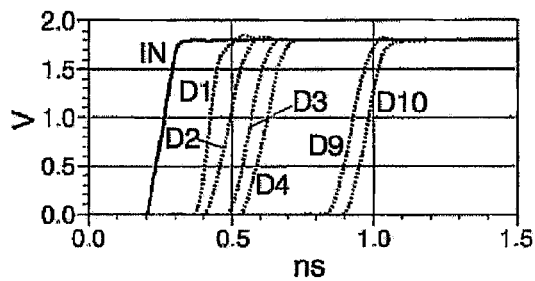
FIGS. 8A-8F schematically illustrate different signals in the pulse generator.
Figure 8B:
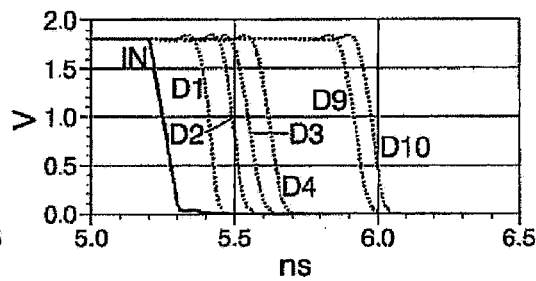
Figure 8C:
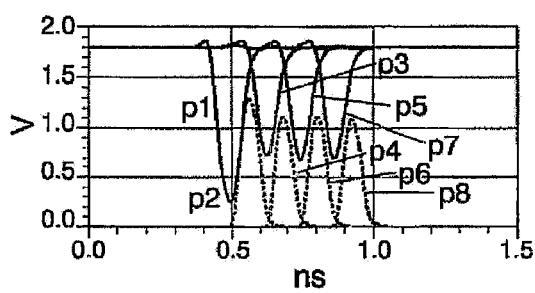
Figure 8D:
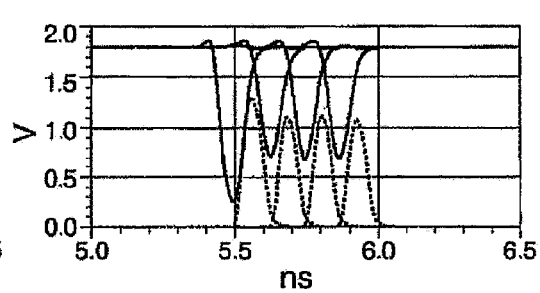
Figure 8E:
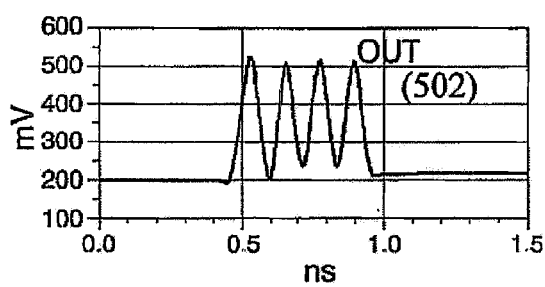
Figure 8F:
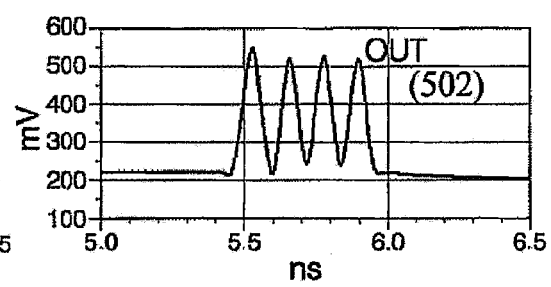

FIGS. 8A-8F show transistor level simulation results when the circuit is operating at a pulse repetition frequency (PRF) of 200 MHz. FIGS. 8A, 8C and 8E show the waveforms generated from a rising edge of the input signal and FIGS. 8B, 8D and 8F illustrate the corresponding waveforms triggered by a falling edge of the input signal.

The vertical axes of FIGS. 8A-8D correspond to the amplitude of the signal in volts (V), and FIGS. 8E and 8F show the amplitudes in mV. The horizontal axes all show the time, in nanoseconds.

In FIGS. 8A and 8B, it can be observed how a rising and falling edge, respectively, of the triggering input signal (IN) applied to the delay line 100, gives rise to the corresponding delayed delay line output signals D1-D10 at the corresponding output buffers 102.

FIGS. 8C and 8D illustrate the corresponding output signals p1-p8 of the pulse generator blocks 201 (FIG. 8C) and 301 (FIG. 8D), respectively.

FIGS. 8E and 8F illustrate the corresponding "combined" pulse signal obtained at the output 502 of the pulse combiner blocks 211 (FIG. 8E) and 311 (FIG. 8F), respectively.

In FIGS. 8C and 8D it can be observed that the two first output pulses from the pulse generator blocks (p1 and p2) have larger amplitude than the other ones (this is because they have to drive the output node from a high impedance state, whereas the next pulses have just have to move the output from high to low voltage or vice versa). This can be compensated by sizing the two first transistors of the pulse combiner circuit differently with regard to the other transistors. As a consequence, the peak-to-peak amplitude of the two single ended signals provided by the pulse combiner blocks can be substantially the same for any of the cycles (cf. FIGS. 8E and 8F).

These single ended outputs depart from an ideal square waveform due to the limited rise and fall times of the output transistors.

In the figures, it can be observed how ten (10) signals obtained from the input delay line are converted into four (4) pulses. Four pulses templates have been found to be especially advantageous for template generators, when the aim is to reduce the signal-to-noise ration degradation due to timing errors. Also, templates based on four pulses are reasonably power efficient.

Figure 9A:
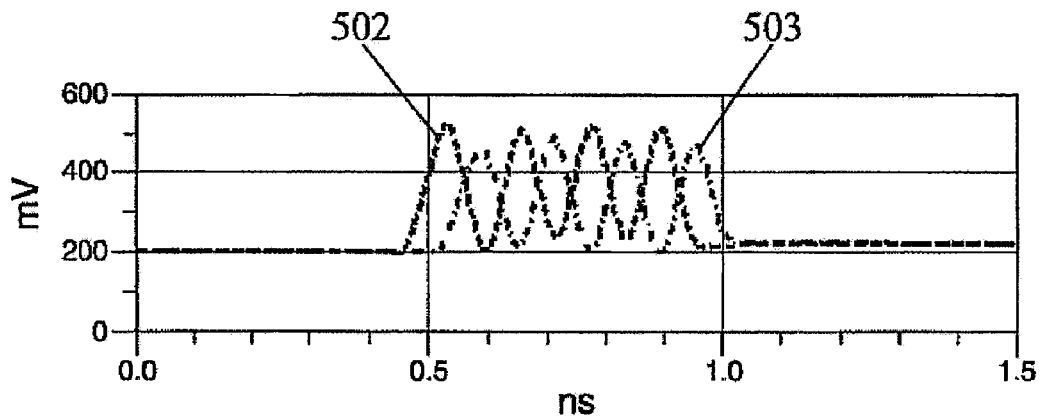
FIGS. 9A-9C schematically illustrate some aspects of the obtained output signals.
Figure 9B:
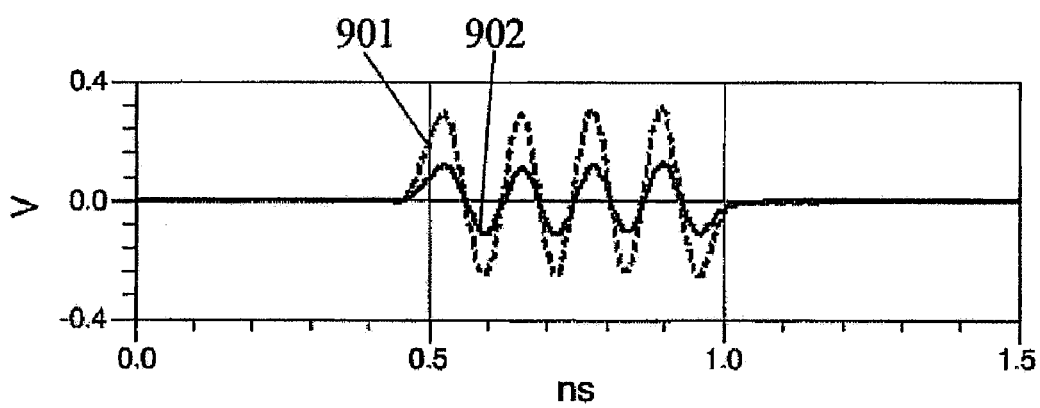
Figure 9C:
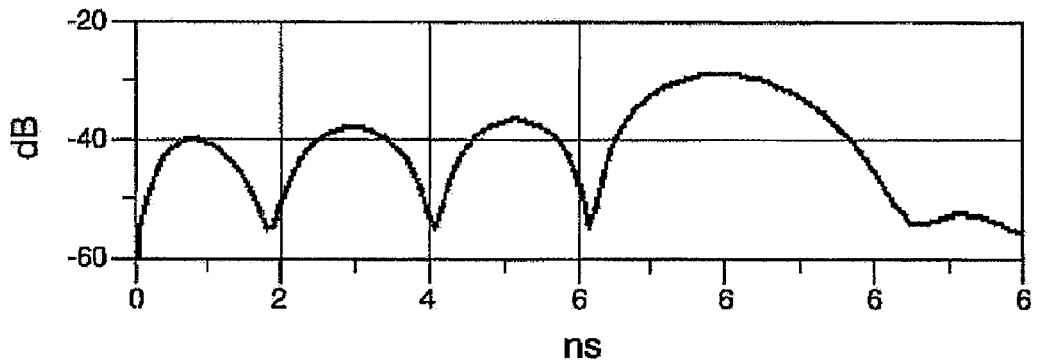

FIG. 9A shows the two single ended outputs of the template, and FIG. 9B show the differential output waveform (obtained after subtracting the two previous waveforms; this subtraction can be obtained by applying the signals at outputs 502 and 503 of the circuit illustrated in FIG. 2 to a simple, conventional differential transistor pair, in a conventional manner). In FIG. 9A, the vertical axis indicates the amplitude in mV, and in FIG. 9B, in V; the horizontal axes indicate the time in nanoseconds. FIG. 9C illustrates a corresponding template spectrum (based on the differential output of FIG. 9B), centred at 8 GHz (the vertical axis corresponds to the relative amplitude, in dBV, whereas the horizontal axis corresponds to the frequency, in GHz).

To obtain realistic template waveform pulse amplitudes the template generator circuit has been connected to a passive mixer circuit. FIG. 9B shows both the unloaded (901) and the loaded (902) amplitudes. It can be observed how the template has an unloaded peak-to-peak amplitude of 550 mV, which is reduced to 230 mV when loaded by the local oscillator port of a typical passive mixer.

The average power consumption of a complete template generator as described above and operating at a supply voltage of 1.8 V has been found to be around 2.0 mW for a pulse repetition frequency of 200 MHz. Most of the power is dissipated by the voltage delay line (approximately 1.55 mW).

In this text, the term "comprises" and its derivations (such as "comprising", etc.) should not be understood in an excluding sense, that is, these terms should not be interpreted as excluding the possibility that what is described and defined may include further elements, steps, etc.

On the other hand, the invention is obviously not limited to the specific embodiment(s) described herein, but also encompasses any variations that may be considered by any person skilled in the art (for example, as regards the choice of materials, dimensions, components, configuration, etc.), within the general scope of the invention as defined in the claims.

What is claimed is:

1. A pulse generator, comprising:
   a delay line arranged to receive a digital input signal and to produce a plurality of delay line output signals each comprising a differently delayed version of said input signal;
   first and second pulse generator blocks, each of said pulse generator blocks comprising logic circuitry arranged to receive, at a plurality of logic circuitry inputs, different ones of said plurality of delay line output signals, each of said pulse generator blocks being arranged to generate a plurality of successive first output pulses in response to said delay line output signals; and
   pulse combiner circuitry arranged to combine said first output pulses in order to produce, in response to said first output pulses from each of said pulse generator blocks, a corresponding plurality of second output pulses;
   wherein first pulse generator block is arranged to be responsive to a rising edge of said input signal so as to produce a first multi-member set of said first output pulses derived from successively delayed versions of said rising edge, and wherein said second pulse generator block is arranged to be responsive to a falling edge of said input signal so as to produce a second multi-member set of said first output pulses derived from successively delayed versions of falling edge.

2. A template generator for an impulse radio receiver, said template generator comprising the pulse generator according to claim 1.

3. An impulse radio receiver arranged to receive impulse radio signals and comprising signal processing circuitry for processing received impulse radio signals to extract an information content, said signal processing circuitry including a template generator for producing a pulse template comprising a plurality of pulses, said signal processing circuitry further including at least one mixer for mixing said pulses with said received signal, wherein said template generator comprises the pulse generator according to claim 1.

4. An impulse radio component comprising the pulse generator according to claim 1.

5. The pulse generator according to claim 1, wherein said first and second pulse generator blocks are identical.

6. The pulse generator according to claim 1, wherein said first pulse generator block and said second pulse generator block are connected to said delay line so that when an input of said first pulse generator block receives a signal from said delay line, a corresponding input of said second pulse generator block receives an inverted version of said signal from said delay line.

7. The pulse generator according to claim 1, wherein each of said first and second pulse generator blocks comprises N inputs and N−1 outputs, said logic circuitry comprising N−1 logic gates each having two inputs and one output, said pulse generator block and said pulse combiner circuitry being arranged so as to produce, for each rising and falling edge of said input signal, a group of (N−1)/2 of said second output pulses.

8. The pulse generator according to claim 7, wherein N=9.

9. The pulse generator according to claim 7, wherein said delay line is arranged to produce at least ten of said delay line output signals by at least ten substantially identical delay cells.

10. The pulse generator according to claim 1, wherein each of said delay line output signals is provided as a non-inverted output and as an inverted output of said delay line.

11. The pulse generator according to claim 1, wherein said pulse combiner circuitry comprises a plurality of cascaded transistor pairs arranged in parallel, connected to a common output end at which said second output pulses are delivered, said cascaded transistor pairs being arranged so that the transistors are activated sequentially by the respective pulse generator block so as to alternatingly connect said output to a first voltage level and to a second voltage level.

12. The pulse generator according to claim 1, wherein said pulse combiner circuit comprises one pulse combiner block for each of said pulse generator blocks, each of said pulse combiner blocks comprising the corresponding pulse combiner circuitry.

13. The pulse generator according to claim 1, further comprising, for each of said first and second pulse generator blocks, two complementary pulse generator blocks arranged with corresponding pulse combiner circuitry so as to produce further second output pulses, combinable with said second output pulses so as to produce a differential output signal.

14. The pulse generator according to claim 1, wherein said first and second pulse generator blocks are arranged so that said first set of said first output pulses is generated in a first time frame and so that said second set of said first output pulses is generated in a second time frame, not overlapping with said first time frame.

15. The pulse generator according to claim 1, wherein said logic circuitry of said first pulse generator block comprises a plurality of logic gates that each produces one of said first output pulses of said first set, and wherein said logic circuitry of said second pulse generator block comprises a plurality of logic gates that each produce one of said first output pulses of said second set.

16. The pulse generator according to claim 15, wherein said logic gates are arranged to be triggered one after the other in accordance with a sequence, wherein said logic gates are arranged in said sequence so that if one logic gate is a first type of logic gate, the following logic gate is a second type of logic gate different than the first type of logic gate.

17. The pulse generator according to claim 15, wherein said logic gates are arranged to produce, one logic gate after the other, each of said first and second sets of said first output pulses in a manner so that, within each of said first and second sets, said first output pulses are, alternatingly, downward pulses and upward pulses.

18. The pulse generator according to claim 17, wherein said logic gates are arranged to be triggered one after the other in accordance with a sequence, wherein said logic gates are arranged in said sequence so that if one logic gate is a first type of logic gate, the following logic gate is a second type of logic gate different than the first type of logic gate.

19. A method of producing a plurality of pulses, comprising the steps of:
  successively delaying a digital input signal so as to produce a plurality of delayed signals each comprising a differently delayed version of said digital input signal;
  supplying said delayed signals to plurality of inputs of a logic circuitry so as to generate a plurality of successive first output pulses in response to said delayed signals;
  combining said first output pulses so as to produce a plurality of second output pulses;
  wherein said delayed signals are supplied to said logic circuitry so that a first multi-member set of said first output pulses are derived from successively delayed versions of a rising edge of said digital input signal, and wherein a second multi-member set of said first output pulses are derived from successively delayed versions of a falling edge of said digital input signal.

20. The method according to claim 19, wherein said logic circuitry comprises a plurality of logic gates arranged to produce, one logic gate after the other and in response to said delayed signals, a respective one of said first output pulses.

21. The method according to claim 20, wherein said logic gates are arranged to produce, one logic gate after the other, said respective one of said first output pulses in a manner so that said, within each of said first and second sets first output pulses are, alternatingly, downward pulses and upward pulses.

22. The method according to claim 19, further comprising generating, for each one of a plurality of subsequent time frames, a template comprising a plurality of subsequent pulses, said plurality of pulses comprising not less than two and not more than five of said second pulses.

23. The method according to claim 22, wherein said plurality of pulses comprises four of said second pulses.

24. The method according to claim 19, wherein said first set of said first output pulses is generated in a first time frame and said second set of said first output pulses is generated in a second time frame, not overlapping with said first time frame.

25. A method of processing a signal received in an impulse radio receiver, so as to extract an information content from said signal, comprising:
  providing a pulse template comprising a plurality of pulses, wherein said plurality of pulses are produced according to the method of claim 19, and
  mixing said pulses with said received signal so as to obtain a resulting signal that is forwarded to a decision making part of the radio receiver.

* * * * *